July 17, 1962 D. P. DONCASTER 3,044,783

PHONOGRAPH PICKUP

Filed Feb. 16, 1961

INVENTOR
DANIEL P. DONCASTER
BY
Brumbaugh, Free, Graves & Donohue

HIS ATTORNEYS

United States Patent Office 3,044,783
Patented July 17, 1962

3,044,783

PHONOGRAPH PICKUP

Daniel P. Doncaster, Rye, N.Y., assignor to Columbia Broadcasting System, Inc., New York, N.Y., a corporation of New York Filed Feb. 16, 1961, Ser. No. 89,846
Claims priority, application Germany Feb. 17, 1960
4 Claims. (Cl. 274—23)

Figure 2:
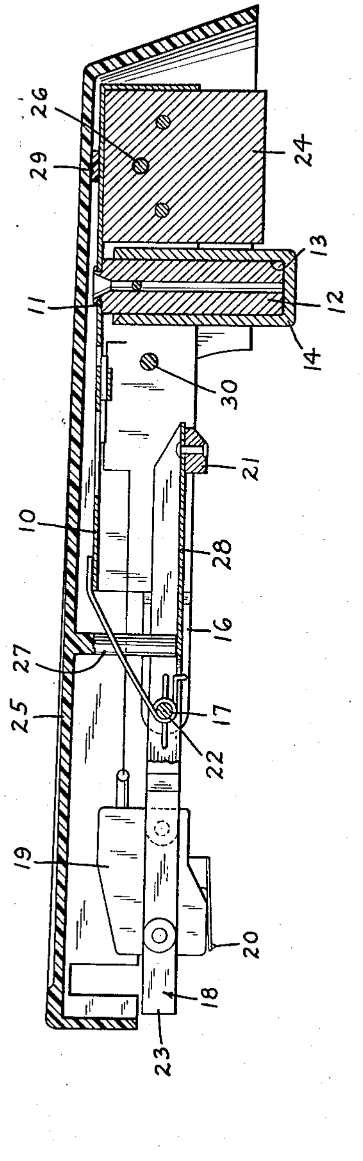

This invention relates to pickups for use with phonograph records and, more particularly, to pickups adapted for effective operation with records which turn at low speed and have grooves of fine pitch and for accurate manipulation without being seen by the operator.

Considerable interest in recent years has centered on techniques for making the contents of books more readily available to the blind. One popular technique is to record readings of books on disc-type records which can be replayed as desired. The rotational speed of such records must be low and the pitch of their grooves fine, so that the number of records required for a book may be kept to a minimum. As a result, effective reproduction of the recorded matter necessitates careful design of the pickup. Also, the pickup should be so constructed that it can be operated correctly by a person with little or no vision.

A United States patent, No. 2,974,961, issued March 14, 1961, discloses a novel pickup that meets many of the requirements stated above. The present invention is of an improved pickup of the type disclosed in that patent which is even better suited for use by the blind.

It is an object of the invention to provide new and improved phonograph record pickup means that is highly effective in operation at low record speeds and with records having a fine groove pitch.

Another object of the invention is to provide new and improved phonograph record pickup means that can be operated easily by a person with no vision.

Another object of the invention is to provide new and improved phonograph record pickup means that can be manipulated with minimum damage to the record.

These and other objects of the invention are attained by providing pickup means comprising a pickup arm movable only in a horizontal plane and having pivotally mounted at its forward end a rocker arm assembly carrying pickup cartridge means at the forward end thereof. The rocker arm assembly is counterbalanced (by a mass, for example) and spring-biased to urge the cartridge means towards a record to be played. The movable pickup arm is also counterbalanced so as to be insensitive to shocks. The pickup arm is further made mechanically resistant to motion as by use of a silicone grease in its supporting bearing, and the construction of the entire assembly is such that its movement is controlled by mechanical resistance rather than by the inertia of the system. The parts described above are covered by a housing which is pivotally mounted at the rear of the pickup arm for movement towards and away from a record to be played. The housing carries an actuator which normally is supported by one end of the rocker arm assembly, the physical constants being so chosen as to maintain the proper stylus pressure on the record being played.

By virtue of the structure described, the pickup is able to function effectively in combination with records having a fine pitch, say 700 lines per inch, and designed to be played at a low speed, such as 8⅓ revolutions per minute. Further, the pickup can easily be operated by a blind person, since it is only necessary to apply pressure to the housing at any point forwardly of its pivot to lift the cartridge stylus from the record being played, thus facilitating removal of the record and its replacement by another. As soon as the pressure on the housing is released, the cartridge stylus drops again into the playing position.

Figure 1:
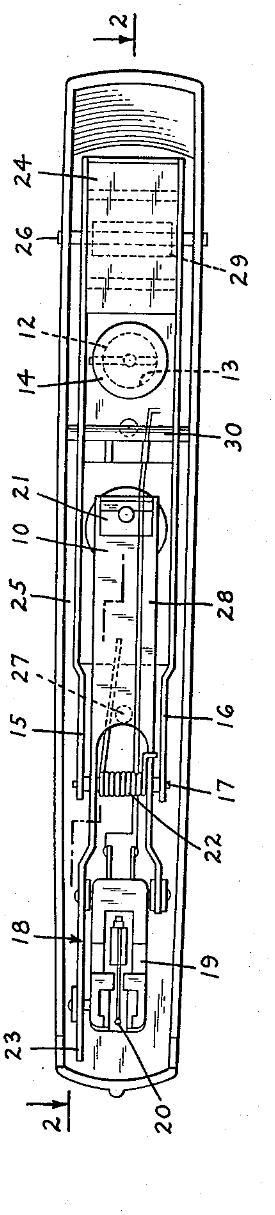

Further particulars of the invention may be better understood from the following detailed description of a typical embodiment thereof and from the accompanying drawing in which:

FIG. 1 is a view from the underside of phonograph pickup apparatus constructed according to the invention; and FIG. 2 is a view in section along the line 2—2 of FIG. 1 in the direction of the arrows.

In FIG. 1 a typical phonograph pickup constructed in accordance with the invention comprises an arm 10 staked or otherwise secured at 11 to a vertical shaft 12. The shaft 12 is adapted to be received in a bore 13 formed in a support member 14 carried by a board which supports the pickup and a turntable (not shown) in the usual manner.

The arm 10 is provided with forwardly-extending portions 15 and 16 in which is journaled a pivot pin 17 adapted to support a rocker arm 18 at a location intermediate its ends. Secured to the forward end of the rocker arm 18 are a conventional cartridge assembly 19 and stylus 20, and to the other end is a counterbalance 21. Normally, the cartridge assembly 19 is urged in the direction of a record to be played by a torsion spring 22 on the pivot pin 17. The rocker arm 18 carries a forward extension 23 which cooperates with means (not shown) for locating the starting position of a record, as in the case of the aforementioned United States patent, No. 2,974,961.

Secured to the rear end of the arm 10 is a mass 24 which serves to counterbalance the rocker arm assembly 18. The arm 10 and the rocker arm assembly 18 are covered by a shell member 25 which is mounted on a pivot 26 extending through the mass 24. The shell 25, which may be made of a suitable plastic material, has a downwardly-depending member 27 adapted normally to rest on a platform 28 comprising the part of the rocker arm assembly 18 nearest the shaft 12. The tension in the spring 22 and the relative masses of the parts are selected so that with the shell 25 resting on the platform 28 as in FIG. 2, the stylus 20 in the cartridge assembly 19 will exert the proper pressure against the record groove. Desirably, damping pads 29 and 30 made of a material such as polyurethane foam are provided at the locations shown.

A suitable damping material—silicone grease, for example—is interposed between the shaft 12 and the bore 13 so as to introduce mechanical resistance to turning of the arm 10. Further, as in the case of the aforementioned patent, No. 2,974,961, the entire assembly is of so little mass that the movement of the arm is governed by the mechanical resistance introduced by the silicone grease rather than by the inertia of the system. Accordingly, the pickup is insensitive to shocks and will track in the record groove correctly at the low speed and fine groove pitch referred to above by way of example.

It is apparent that the cartridge stylus 20 can be lifted from a playing position on the record by a downward pressure on the shell 25 at any point forwardly of its pivot 26 and that it is an easy matter for a blind person to raise the stylus 20 from a record after it has been played and to move the arm to the starting position in preparation for the playing of a new record.

The invention thus provides a novel phonograph pickup apparatus which is adapted for highly effective operation at low speeds or normal speeds and for manipulation even by a person with little or no vision with little risk of damage to a record or cartridge due to mishandling. The pickup of the invention is ideally suited for applications such as the reproduction of low-speed records of the kind used for recording the contents of books for the blind.

The specific embodiment disclosed is intended to be merely illustrative and is susceptible of modification in form and detail within the spirit of the invention. The invention, therefore, is intended to comprehend all of the modifications falling within the scope of the following claims.

I claim:

1. A phonograph pickup comprising an arm fixed to a shaft, rocker-arm means pivotally mounted intermediate the ends thereof on said arm in spaced-apart relation to said shaft, stylus-actuated cartridge means secured to said rocker-arm means on one side of the pivot therefor, said arm, said rocker-arm means and said cartridge means being covered by a shell member which is mounted for pivoting movement about a pivot means carried by said arm at a location near said shaft, said shell member including means engageable with said rocker-arm means on the other side of the pivot therefor to lift said cartridge means away from a record.

2. A phonograph pickup as defined in claim 1, in which means is provided for normally urging the cartridge towards a record, and the masses of the component parts of the pickup are selected so that the cartridge stylus exerts a predetermined pressure on a record when the shell-member engageable means rests upon the rocker arm means.

3. A phonograph pickup as defined in claim 1, in which both the arm and the rocker-arm means are provided with counterbalancing masses.

4. A phonograph pickup as defined in claim 1 in which the shaft on which the arm is fixed is mounted in a bore in a support member, silicone grease being provided between the shaft and the wall of the bore to introduce mechanical resistance to movement of said arm, the mass of said pickup being sufficiently small that its movement is governed principally by said mechanical resistance.

No references cited.